Figure 1:
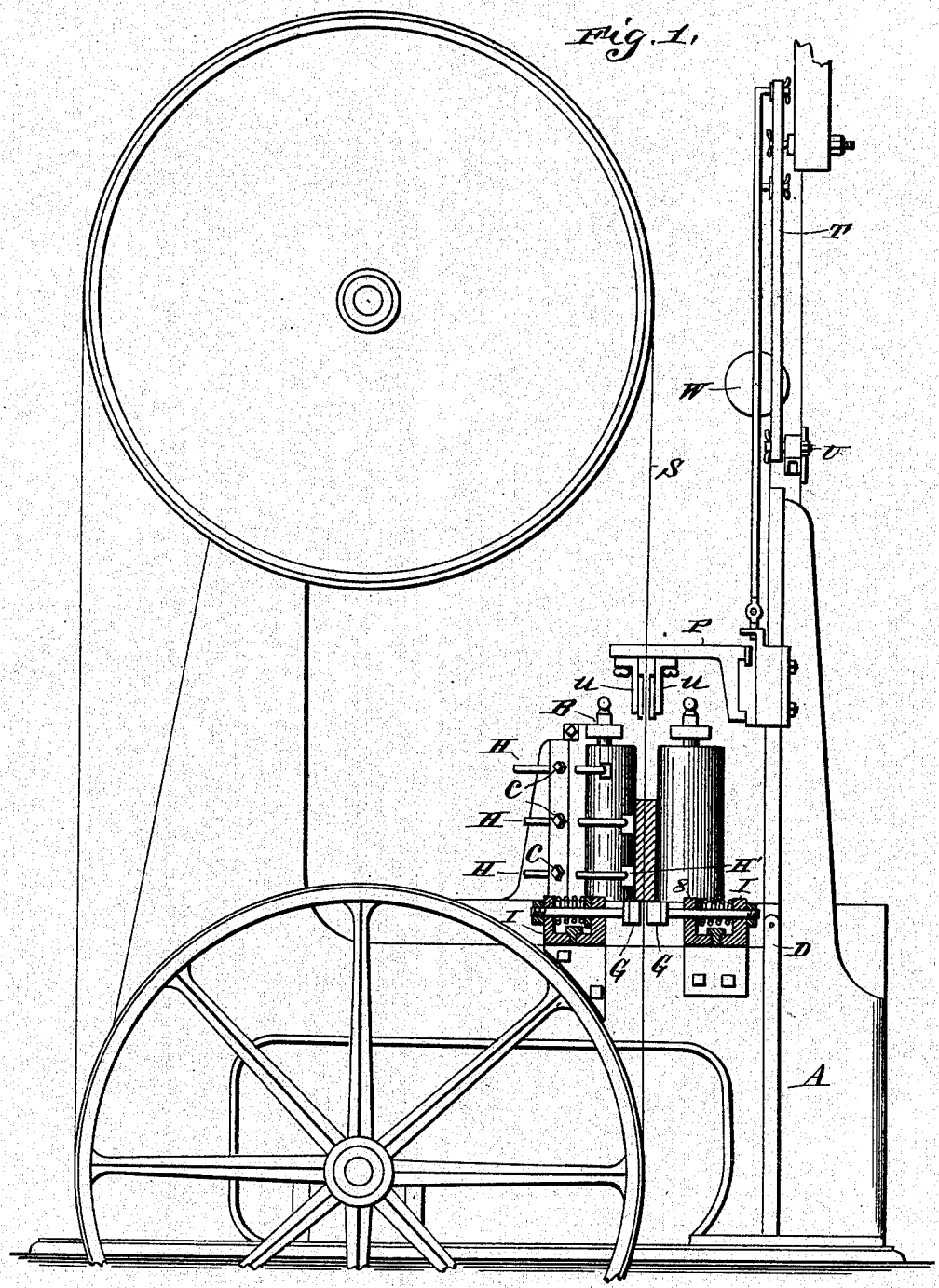

(No Model.) 2 Sheets—Sheet 1.

E. C. MERSHON.
BAND SAWING MACHINE.

No. 505,080. Patented Sept. 12, 1893.

Witnesses:
J. F. O'Keefe
Fannie Robbins

Edward C. Mershon
Inventor:
By A. H. Gauntsvoort
his Atty.

(No Model.)  
E. C. MERSHON.  
BAND SAWING MACHINE.
No. 505,080.  
Patented Sept. 12, 1893.
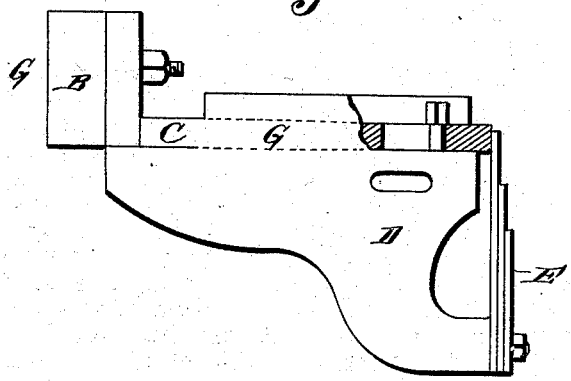
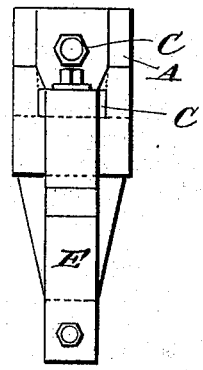
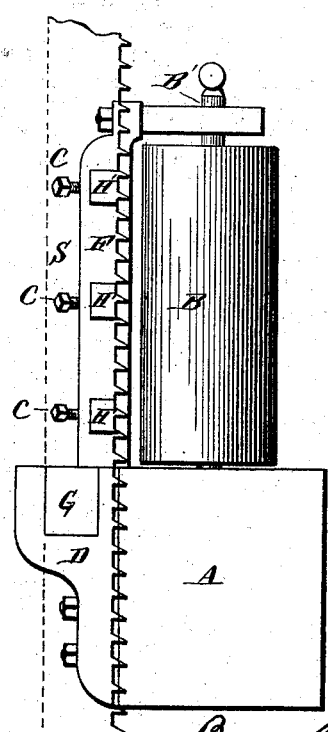
Witnesses:  
J H O'Keefe  
Fannie Robbins
Inventor:  
Edward C. Mershon  
By A. H. Swarthout  
His Atty.

UNITED STATES PATENT OFFICE.

EDWARD C. MERSHON, OF SAGINAW, MICHIGAN.

BAND SAWING-MACHINE.

SPECIFICATION forming part of Letters Patent No. 505,080, dated September 12, 1893.

Application filed December 12, 1892. Serial No. 454,958. (No model.)

*To all whom it may concern:*

Be it known that I, EDWARD C. MERSHON, a citizen of the United States, residing at Saginaw, in the county of Saginaw and State of Michigan, have invented certain new and useful Improvements in Band Sawing-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to saw guides in band re-sawing machines, its object being to so guide the saw that in sawing uneven and warped lumber the saw blade will not be warped, or bent out of shape and the material finished unsatisfactorily. In machines as usually constructed no adequate means are provided for feeding the lumber in an absolutely straight line, parallel to the horizontal face of the saw blade. If the lumber is crooked in passing over the rolls the crooks pry the saw from side to side the result being imperfectly and unsatisfactorily finished material. To overcome this difficulty I have invented the following described devices.

Figure 1 is a rear elevation of a band saw machine provided with my invention. Fig. 2 is a plan view showing a method of attaching a spring to the lower saw guides. Fig. 3 is a side view of Fig. 2. Fig. 4 is a side view of presser bars and guides.

F is a vertical arm secured at its base to the yielding frame of the feed rolls in the rear of the inner roller B, its upper end bowing over the top of the roller and secured to the roller box B'.

To the frame F I attach two or more bars H H extending inwardly to near the saw S, their inner end being provided with a broad perpendicular face H', which approaches the material being sawed at a point on the saw blade back of the teeth. These bars H are held in the frame F by set screws C and can be adjusted to and from the saw as desired. When sawing narrow stuff the upper bars may be withdrawn so as to be out of the way of the upper saw guides. It is obvious that after these bars have been adjusted against the material being sawed any unevenness in the material as it passes through the rolls will not effect the saw nor cause any variation in the cut of the saw. With band re-saws, as usually constructed, the lower guides are rigid, and if for any reason the saw is crowded to one side, as it often is, it will be stretched out of shape by the undue strain. This would be the case in using my presser bars in attempting to saw a narrow strip after a wide one, or when the last strip has passed the rollers. For after the end of the wide strip or last strip has passed the last roller in front of the saw, the rollers spring together, and the presser bars being connected to them, and being only on one side of the saw, will be forced against the material and saw, causing the saw to be strained. To overcome this difficulty I use a yielding guide, which consists in the usual bar, plates, &c., constructed as shown.

In Fig. 1 I show the guides constructed in the usual way and provided with a coiled spring I around the guide bar G. As the strain comes upon the saw it pushes the bar G back upon the spring thus relieving the saw, and after the strain is over the spring forces the guide to its proper position. The action is the same with the leaf spring shown in Fig. 2. I do not wish to confine myself to any special construction of the spring guides. It is obvious that a weight may be so attached as to answer the same purpose. This I claim the right to do.

Having thus described my invention, what I claim as new, and desire to secure by Letters Patent, is—

1. In a band resawing machine, the combination with the frame of the feed rolls, of a vertical frame in the rear of the feed rolls, and integral with the frame of the feed rolls and adapted to receive laterally extending adjustable pressure bars and one or more laterally extending adjustable pressure bars adapted to press against the material being sawed at a point opposite the base of the saw teeth, substantially as described.

2. In a band resawing machine, the combination with the frame supporting the saw wheels, and carrying an endless band saw, the band saw, the feed rolls, pressure bars adjustably secured to a frame integral with the feed roll frame and adapted to press against the material being sawed at a point opposite the base of the saw teeth, of horizontal bars G having a broad end adapted to press against the saw blade, springs I actuating the bars G, the whole secured in grooves in frames D secured in the main frame, substantially as specified.

3. In automatically adjusting guides for a band saw, the combination with independent horizontal bars on each side of the saw and below the material being sawed, having a broad face next the saw, of independent springs or weights connected to each bar, adapted to resist the lateral movement of the bars when the saw is strained, and to restore the bars to their position, substantially as and for the purpose set forth.

4. In a band resawing machine, laterally adjustable pressure bars consisting of two or more independent bars having a broad face, held in a vertical frame, one above the other, so as to support the material being sawed at a point opposite the base of the saw teeth, and adjustable to and from the material independently, substantially as specified.

In testimony whereof I affix my signature in presence of two witnesses.

EDWARD C. MERSHON.

Witnesses:
A. H. SWARTHOUT,
CHARLES S. WATSON.